US011286802B2

(12) United States Patent
Vetters et al.

(10) Patent No.: US 11,286,802 B2
(45) Date of Patent: Mar. 29, 2022

(54) TURBINE SHROUD SEGMENT HAVING A SEAL SEGMENT PERIMETER SEAL WITH SEPARATED BUFFER CAVITIES

(71) Applicants: Rolls-Royce Corporation, Indianapolis, IN (US); Rolls-Royce High Temperature Composites, Inc., Cypress, CA (US)

(72) Inventors: Daniel K. Vetters, Indianapolis, IN (US); Aaron D. Sippel, Zionsville, IN (US); Jeffrey M. Crutchfield, Long Beach, CA (US); Jeffrey A. Walston, Indianapolis, IN (US)

(73) Assignees: Rolls-Royce Corporation, Indianapolis, IN (US); Rolls-Royce High Temperature Composites Inc., Cypress, CA (US)

( * ) Notice: Subject to any disclaimer, the term of this patent is extended or adjusted under 35 U.S.C. 154(b) by 264 days.

(21) Appl. No.: 16/597,495

(22) Filed: Oct. 9, 2019

(65) Prior Publication Data

US 2021/0108531 A1 Apr. 15, 2021

(51) Int. Cl.
*F01D 11/08* (2006.01)
*F01D 25/24* (2006.01)
*F01D 9/04* (2006.01)

(52) U.S. Cl.
CPC .............. *F01D 11/08* (2013.01); *F01D 9/042* (2013.01); *F01D 25/246* (2013.01); *F05D 2240/11* (2013.01); *F05D 2260/30* (2013.01); *F05D 2300/6033* (2013.01)

(58) Field of Classification Search
CPC ...... F01D 25/12; F01D 25/246; F01D 25/005; F01D 11/20; F01D 11/08; F01D 9/02; F01D 9/042; F05D 2260/20; F05D 2260/201; F05D 2240/11; F05D 220/32; F05D 2300/6033; F05D 2220/32
See application file for complete search history.

(56) References Cited

U.S. PATENT DOCUMENTS

| | | |
|---|---|---|
| 8,322,976 B2 | 12/2012 | Chila et al. |
| 9,175,579 B2 | 11/2015 | Franks et al. |
| 9,963,990 B2 | 5/2018 | Vetters et al. |
| 10,047,624 B2 | 10/2018 | O'Leary et al. |
| 10,094,234 B2 | 10/2018 | O'Leary et al. |
| 10,196,919 B2 | 2/2019 | O'Leary et al. |
| 10,221,713 B2 | 3/2019 | Vetters et al. |
| 2014/0294572 A1 | 10/2014 | Hillier et al. |
| 2015/0377050 A1 | 12/2015 | Freeman et al. |
| 2016/0376921 A1* | 12/2016 | O'Leary ............ F01D 25/12 415/116 |
| 2017/0321567 A1* | 11/2017 | Vetters ............ F01D 11/02 |
| 2018/0149031 A1* | 5/2018 | Sippel ............ F01D 25/246 |
| 2018/0298773 A1 | 10/2018 | Vetters |

* cited by examiner

*Primary Examiner* — Woody A Lee, Jr.
*Assistant Examiner* — Maxime M Adjagbe
(74) *Attorney, Agent, or Firm* — Barnes & Thornburg LLP (57) ABSTRACT

A turbine shroud segment of a gas turbine engine includes a carrier segment, a blade track segment, and a plurality of seals arranged between the carrier segment and the blade track segment. The plurality of seals are arranged between the carrier segment and the blade track segment to block gases from passing between the carrier segment and the blade track segment.

20 Claims, 5 Drawing Sheets

TURBINE SHROUD SEGMENT HAVING A SEAL SEGMENT PERIMETER SEAL WITH SEPARATED BUFFER CAVITIES

FIELD OF THE DISCLOSURE

The present disclosure relates generally to gas turbine engines, and more specifically to turbine shroud segments with ceramic matrix composite components that define a primary gas path through gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. In some applications, shroud assemblies define flow paths to assist in guiding exhaust products through the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, sealing between these components with traditional seal arrangements may not be as affected due to the differing levels of expansion and contraction during operation of the gas turbine engine, as well as the lower stress allowable of the ceramic matrix composite components compared to metallic components.

SUMMARY

The present disclosure may comprise one or more of the following features and combinations thereof.

A turbine shroud segment may include a carrier segment, a blade track segment, and a plurality of seals. The carrier segment may comprise metallic materials and may extend circumferentially partway about an axis. The blade track segment may comprise ceramic matrix composite materials. The plurality of seals may be located between the carrier and the blade track segment and may engage with the carrier and the blade track segment to block gases from flowing between the carrier segment and the blade track segment.

In some embodiments, the carrier segment may include a carrier body and a plurality of dams. The carrier body may be formed to define a radially inwardly opening attachment-receiving space and a radially inwardly opening channel that extends around the attachment-receiving space. The plurality of dams may be located in the channel to separate the channel into a plurality of sections.

In some embodiments, the blade track segment may be formed to include a runner and an attachment portion. The runner may be shaped to extend circumferentially partway around the axis. The attachment portion may extend radially outward from the runner into the attachment-receiving space formed by the carrier body.

In some embodiments, a portion of each of the plurality of dams may be exposed and not engaged by the plurality seals. The dams may be exposed to allow fluid communication between the plurality of sections of the channel through gaps defined radially between the plurality of dams and the runner of the blade track segment.

In some embodiments, the plurality of dams may include a first dam and a second dam. The first dam may be located on a first circumferential side of the carrier body. The second dam may be located on a second circumferential side of the carrier body. The first and second dams may define a trailing edge section included in the plurality of sections of the channel that extends along at least a trailing edge of the carrier body.

In some embodiments, the plurality of seals may include a first wire seal. The first wire seal may be located in the trailing edge section. The first wire seal may extend circumferentially along an entire length of the trailing edge section.

In some embodiments, the plurality of seals may include a second wire seal. The second wire seal may be located in the trailing edge section and the first wire seal may be spaced apart axially from the second wire seal. The second wire seal may extend circumferentially less than the entire length of the trailing edge section.

In some embodiments, the trailing edge section may include a fore surface, an aft surface, a first side surface, and a second side surface. The aft surface may be spaced apart axially from the fore surface. The second side surface may be spaced apart circumferentially from the first side surface.

In some embodiments, the first wire seal may extend along the aft surface. The second wire seal may extend along the fore surface so that portions of the fore surface, the first side surface, and the second side surface are exposed to gases in the trailing edge section. In some embodiments, the first wire seal may be engaged with the aft surface of the trailing edge section and may be the only seal in the trailing edge section such that the fore surface, the first side surface, and the second side surface are exposed to gases in the trailing edge section.

In some embodiments, the trailing edge section of the channel may extend at least partway along the first circumferential side and the second circumferential side of the carrier body. In some embodiments, the plurality of sections of the channel may include a trailing edge section that extends only circumferentially along a trailing edge side of the carrier body.

In some embodiments, the plurality of seals may include a plurality of wire seals.

In some embodiments, the carrier body is formed to include a plurality of feed holes. The feed holes may open into the channel to provide cooling air to the channel. In some embodiments, the plurality of feed holes may not open into at least one of the plurality of sections of the channel.

According to another aspect of the present disclosure, a turbine shroud segment may include a carrier segment, a blade track segment, and a plurality of seals. The carrier segment may extend circumferentially partway about an axis. The plurality of seals may be arranged between the carrier segment and the blade track segment.

In some embodiments, the carrier segment may be formed to define an attachment-receiving space and a channel. The channel may extend around the attachment-receiving space. Ins some embodiments, the channel may be separated into a first section and a second section by a dam located in the channel.

In some embodiments, the blade track segment may be formed to include a runner and an attachment portion. The runner may be shaped to extend circumferentially partway around the axis. The attachment portion may extend radially outward from the runner into the attachment-receiving space.

In some embodiments, the plurality of seals may be located in the channel. In some embodiments, the plurality of seals may not extend along a portion of the first section and the second section of the channel such that the portion is unsealed. The unsealed portion may allow fluid communication between the first section and the second section through a gap formed radially between the dam and the runner of the blade track segment.

In some embodiments, the dam may include a fore face and an aft face. In some embodiments, the plurality of seals may not extend along a least a portion of the fore face and the aft face of the dam so that the portion of the fore face and the aft face of the dam are exposed to gases in the first section and the second section of the channel.

In some embodiments, the second section of the channel may include a fore surface, an aft surface, a first side surface, and a second side surface. The aft surface may be spaced apart axially from the fore surface. The second side surface may be spaced apart circumferentially from the first side surface.

In some embodiments, the plurality of seals may include a first seal and a second seal. The first seal may extend circumferentially along an entire length of the aft surface. The second seal may extend circumferentially along less than an entire length of the fore surface.

In some embodiments, the first section of the channel may extend along a leading edge side, a first circumferential side, and a second circumferential side of the carrier segment. In some embodiments, the second section may extend only along a trailing edge side of the carrier segment.

In some embodiments, the first section of the channel may extend along a leading edge side, a first circumferential side, and a second circumferential side of the carrier segment. The second section may extend along a trailing edge side, the first circumferential side, and the second circumferential side of the carrier segment.

In some embodiments, the second section of the channel may include a fore surface, an aft surface, a first side surface, and a second side surface. The aft surface may be spaced apart axially from the fore surface. The second side surface may be spaced apart circumferentially from the first side surface. In some embodiments, the plurality of seals may be spaced apart from the fore surface such that the entire fore surface is exposed to gases in the second section of the channel.

In some embodiments, the carrier segment may be formed to include a plurality of feed holes. The feed holes may open into the first section of the channel. In some embodiments, no feed holes may open into the second section of the channel.

According to another aspect of the present disclosure, a method may include several steps. The method may include providing a carrier segment, a blade track, and a plurality of seals. The carrier segment may be formed to define a radially inwardly opening attachment-receiving space and a channel. The channel may be separated by a dam into a first section that extends along at least a leading edge side and a second section that extends along at least a trailing edge side of the carrier segment.

In some embodiments, the method may further include locating the plurality of seals in the first section and the second section of the channel so that at least a portion of the dam is exposed, locating a portion of the blade track segment in the attachment-receiving space of the carrier segment to cause the plurality of seals to engage the carrier segment and the blade track segment and form a gap between the dam and the blade track segment, conducting gases into the first section of the channel, and conducting the gases from the first section of the channel through the gap and into the second section of the channel. In some embodiments, the method may further include conducting gases from the second section of the channel into the attachment-receiving space through a gap formed between the second section of the channel and the attachment-receiving space.

In some embodiments, the conducting gases into the first section may include conducting gases through feed holes formed in the carrier segment into the first section. In some embodiments, no feed holes may open into the second section of the channel.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
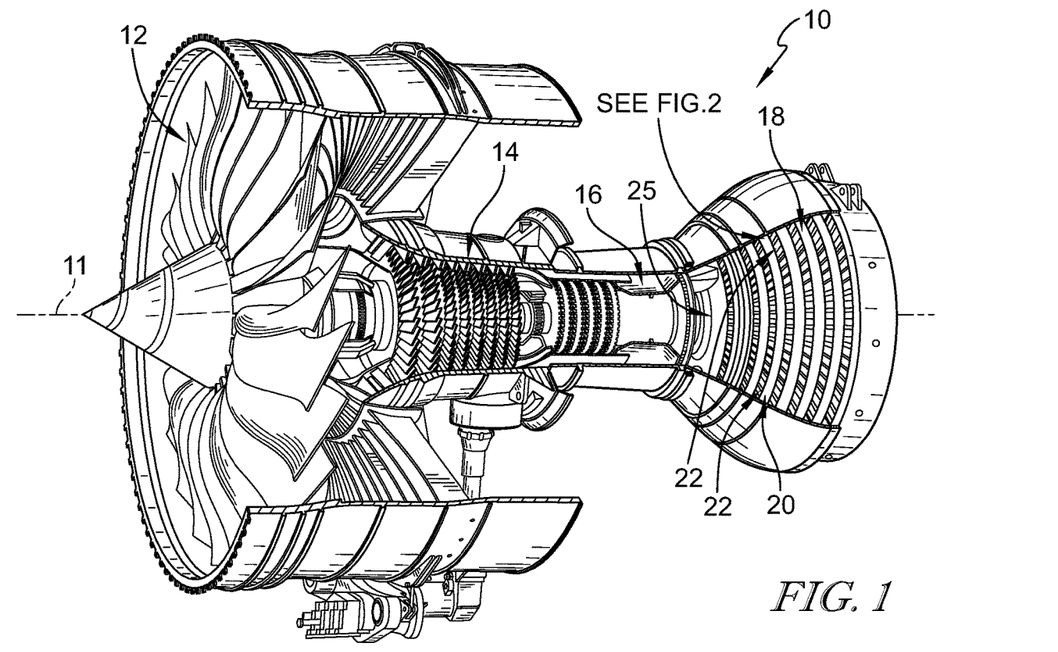
FIG. 1 is a cutaway view of a gas turbine engine that includes a fan, a compressor, a combustor, and a turbine, the turbine including rotating wheel assemblies configured to rotate about an axis of the engine, turbine shrouds arranged around the wheel assemblies, and static turbine vane rings configured to direct air into downstream rotating wheel assemblies.
Figure 2:
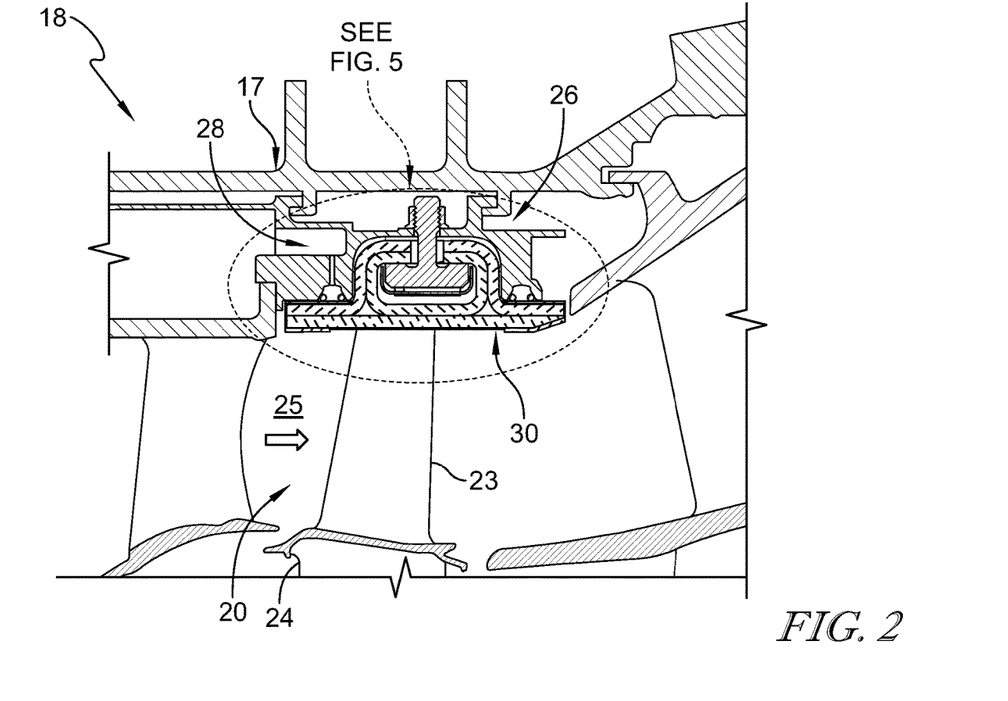
FIG. 2 is a cross section view of a portion of the gas turbine engine of FIG. 1 showing a turbine shroud positioned radially outward from blades of a turbine wheel assembly, the turbine shroud segment including a carrier segment coupled to an outer case of the turbine section, a blade track segment, and a plurality of seals located in a channel formed in the carrier segment and adapted to block gases from flowing between the carrier segment and the blade track segment.
Figure 3:
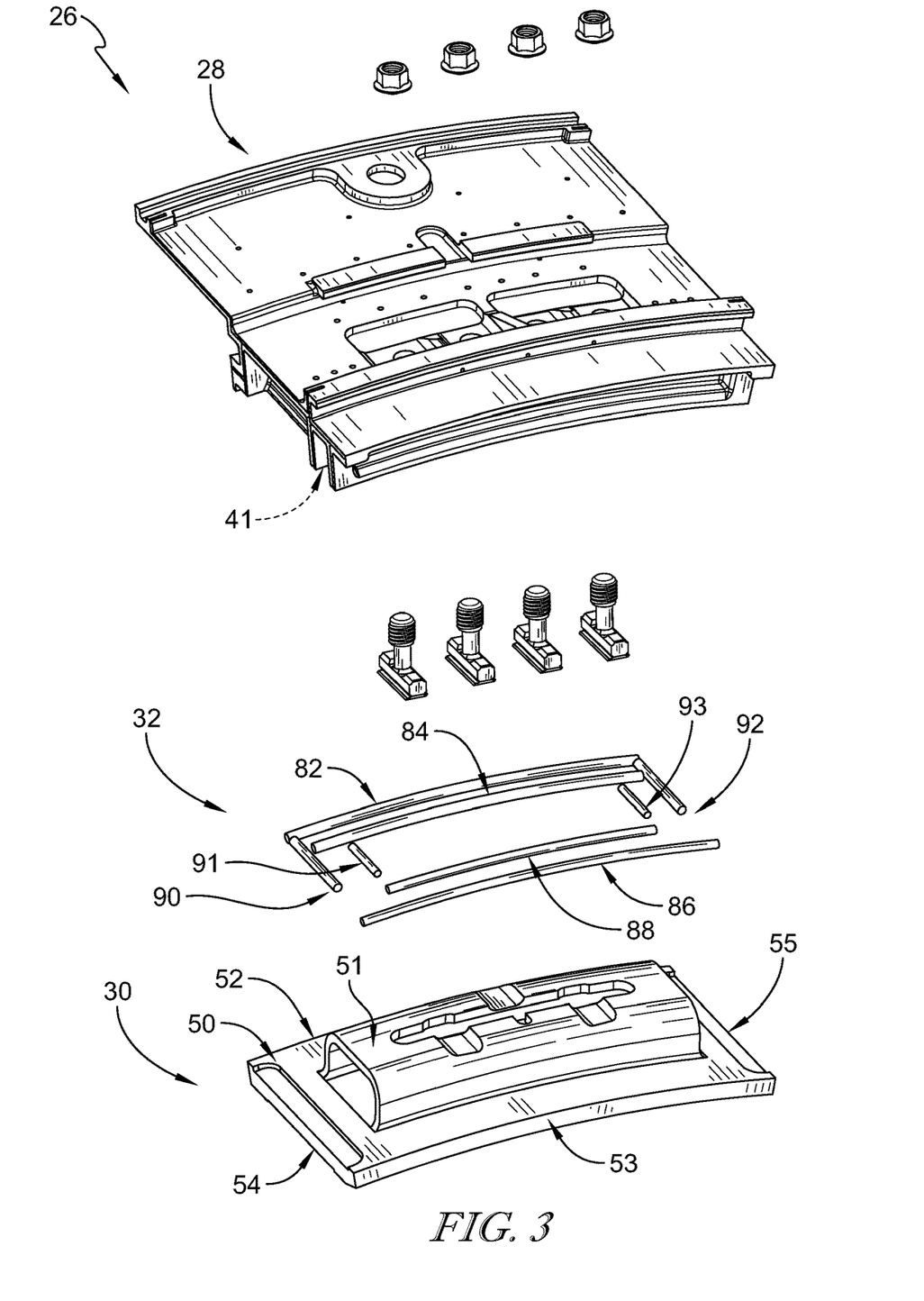
FIG. 3 is an exploded view of the turbine shroud segment of FIG. 2 showing the blade track segment includes a runner shaped to extend partway about the axis and an attachment portion adapted to extend into the carrier segment to couple the blade track segment to the carrier segment, and further showing the plurality of seals extend around the attachment portion and include two aft seals of differing lengths.

A turbine shroud segment 26 according to the present disclosure is adapted for use in a gas turbine engine 10 as suggested in FIGS. 1 and 2. The gas turbine engine 10 includes a fan 12, a compressor 14, a combustor 16, and a turbine section 18 as shown in FIG. 1. The fan 12 is driven by the turbine section 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine section 18 to cause components of the turbine section 18 to rotate about a central axis 11 and drive the compressor 14 and the fan 12. In other embodiments, the fan is omitted and replaced with a propeller, turboshaft, or gearbox.

The turbine section 18 includes at least one turbine wheel assembly 20 and a turbine shroud 22 positioned to surround the turbine wheel assembly 20 as shown in FIGS. 1 and 2. The turbine wheel assembly 20 includes a plurality of blades 23 coupled to a rotor disk 24 for rotation with the disk 24. The hot, high pressure combustion products from the combustor 16 are directed toward the blades 23 of the turbine wheel assemblies 20 along a flow path 25. The turbine shroud 22 is coupled to an outer case 17 of the gas turbine engine 10 and extends around the turbine wheel assembly 20 to block gases from passing over the turbine blades 23 during use of the turbine section 18 in the gas turbine engine 10.

In the illustrative embodiment, the turbine shroud 22 is made up of a number of turbine shroud segments 26 that each extend circumferentially partway around the axis 11 and cooperate to surround the turbine wheel assembly 20. In other embodiments, the turbine shroud 22 is annular and non-segmented to extend fully around the central axis 11 and surround the turbine wheel assembly 20. In yet other embodiments, certain components of the turbine shroud 22 are segmented while other components are annular and non-segmented.

Each turbine shroud segment 26 includes a carrier segment 28, a blade track segment 30, and a plurality of seals 32 as shown in FIGS. 2-6. The carrier segment 28 is a metallic component supported by the outer casing 17 and is configured to support the blade track segment 30 in position adjacent to the blades 23 of the turbine wheel assembly 20. The carrier segment 28 extends circumferentially partway about the axis 11. The blade track segment 30 comprises ceramic matrix composite materials and includes a runner 50 arranged radially outward of the blades 23 and an attachment portion 51 that extends radially outward from the runner 50 into the carrier segment 28. The plurality of seals 32 are arranged between the carrier segment 28 and the blade track segment 30 to block gases from flowing between the carrier segment and the blade track segment 30.

Figure 4:
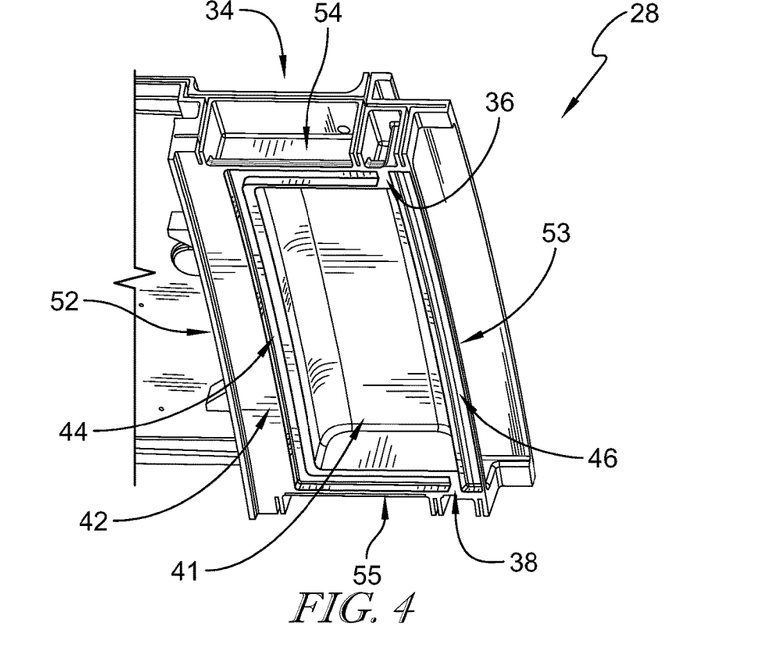
FIG. 4 is a perspective view of an inner side of the carrier segment of the turbine shroud segment of FIG. 2 showing the carrier segment includes a carrier body formed to define a channel that extends around a perimeter of the carrier segment and a plurality of dams located in the channel to separate the channel into a plurality of sections for controlling air pressure in each section.
Figure 5:
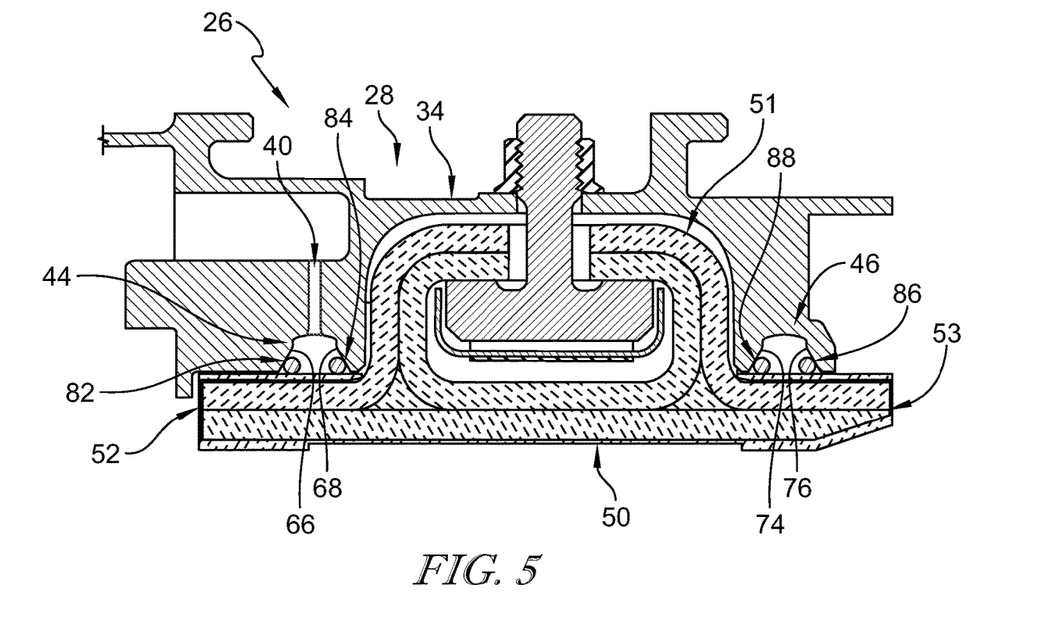
FIG. 5 is a section view of the turbine shroud segment of FIG. 2 showing the radially inwardly opening channel is divided into a leading edge section located at the leading edge of the carrier segment and a trailing edge section located at the trailing edge of the carrier segment, and further showing the leading edge section is supplied a flow of air to pressurized the leading edge section, while the trailing edge section is not directly pressurized.
Figure 6:
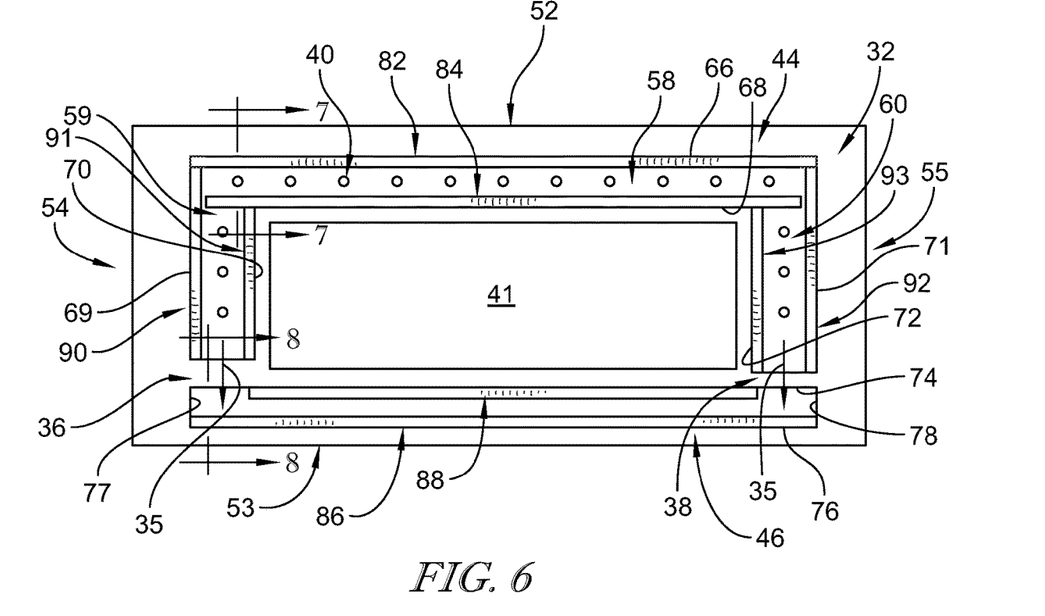
FIG. 6 is an inner view of the carrier segment of FIG. 4 showing the channel formed in the carrier body and the dams located in the channel to define the trailing edge section of the channel and suggesting that pressurized air enters the channel through the feed holes in the leading edge section and then passes between the dams and the blade track segment to indirectly pressurize the trailing edge section of the channel.

The carrier segment 28 includes a carrier body 34, a plurality of dams 36, 38, and a plurality of feed holes 40 as shown in FIGS. 4-6. The carrier body 34 is formed to define a radially inwardly opening attachment-receiving space 41 that receives the attachment portion 51 and a radially inwardly opening channel 42 that extends around the attachment-receiving space 41. The plurality of dams 36, 38 are located in the channel 42 to separate the channel 42 into a leading edge section 44 and a trailing edge section 46. The leading edge section 44 extends along at least at least a leading edge 52 of the carrier body 34, while the trailing edge section 46 extends along at least a trailing edge 53 of the carrier body 34. The plurality of feed holes 40 extend through the carrier body 34 and open into the leading edge section 44 to provide a flow of air to the channel 42. In other embodiments, the plurality of dams includes additional dams to separate the channel 42 into additional sections.

In the illustrative embodiment, the plurality of seals 32 are located in the channel 42 along the leading edge 52, the trailing edge 53, and circumferential sides 54, 55 of the carrier body 34. The flow of air transmitted by the feed holes 40 pressurizes the leading edge section 44 to engage the seals 32 in the leading edge section 44, blocking hot gases from the flow path 25 from entering the space 41.

Figure 8:
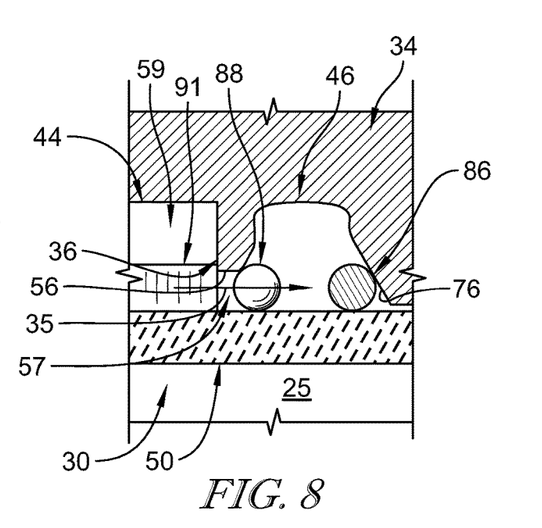
FIG. 8 is cross section view of the turbine shroud segment of FIG. 6 taken along line 8-8 showing the plurality of seals includes a first trailing edge seal that extends along an aft surface of the trailing edge section and a second trailing edge seal that extends along a fore surface of the trailing edge section up until the dams so as to allow a flow of air to pass between the dam and the blade track segment to enter the trailing edge section from the leading edge section.

A portion 56 of each of the plurality of dams 36, 38 is not engaged by the plurality of seals 32 as shown in FIG. 8. The portions 56 of the dams 36, 38 are exposed to allow fluid communication between the plurality of sections 44, 46 through gaps 57 defined radially between the plurality of dams 36, 38 and the runner 50 of the blade track segment 30 as shown in FIG. 8. This fluid communication or leakage across the dams 36, 38, indicated by arrows 35, pressurizes the trailing edge section 46 helping to seal the trailing edge section 46, while minimizing the need for additional flow of air to be provided to the trailing edge section 46. As such, feed holes 40 are not formed in the trailing edge section in the illustrative embodiments.

Figure 7:
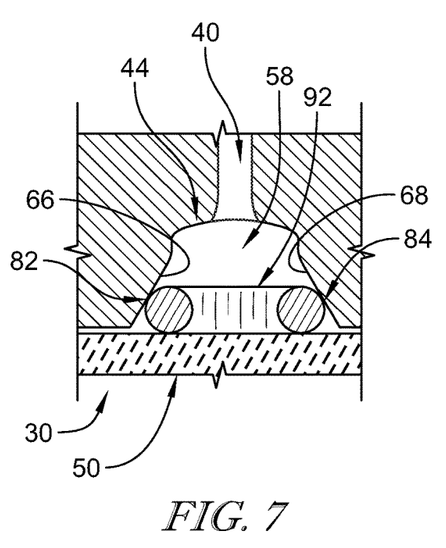
FIG. 7 is cross section view of the turbine shroud segment of FIG. 6 taken along line 7-7 showing the plurality of seals includes a first leading edge seal that engages a fore surface of the leading edge portion and a second leading edge seal that engages an aft surface of the leading edge portion to seal the leading edge section along the leading edge of the carrier body and suggesting that air is able to pass over the outer side of the seals within the channel.

In the illustrative embodiment, the leading edge section 44 includes a leading edge portion 58, a first circumferential side portion 59, and a second circumferential side portion 60 as shown in FIGS. 6 and 7. The leading edge portion 58 extends along the leading edge 52. The first circumferential side portion 59 extends axially aft from the leading edge portion 58 along a first circumferential side 54 of the carrier body 34 toward the trailing edge 53. The second circumferential side portion 60 extends axially aft from the leading edge portion 58 along a second circumferential side 55 of the carrier body 34.

The plurality of dams 36, 38 includes a first dam 36 and a second dam 38 as shown in FIGS. 4, 6, and 8. The first dam 36 is located on a first circumferential side 54 of the carrier body 34 at an end of the first circumferential side portion 59. The second dam 38 is located on a second circumferential side 55 of the carrier body 34 at an end of the second circumferential side portion 60. The first dam 36 and the second dam 38 are arranged within the channel 42 to define the leading edge section 44 and the trailing edge section 46. The leading edge portion 58 of the leading edge section 44 includes a fore surface 66 and an aft surface 68 as shown in FIG. 5-7. The aft surface 68 is spaced apart axially from the fore surface 66.

The first circumferential side portion 59 of the leading edge section 44 includes a first side surface 69 and a second side surface 70 as shown in FIG. 6. The first side surface 69 extends axially aft from the fore surface 66 of the leading edge portion 58. The second side surface 70 is spaced apart circumferentially from the first side surface 69 and extends axially aft from the aft surface 68. The second circumferential side portion 60 of the leading edge section 44 includes a third side surface 71 and a fourth side surface 72 as shown in FIG. 6. The third side surface 71 extends axially aft from the fore surface 66 of the leading edge portion 58. The fourth side surface 72 is spaced apart circumferentially from the third side surface 71 and extends axially aft from the aft surface 68.

The trailing edge section 46 includes a fore surface 74, an aft surface 76, a fifth side surface 77, and a sixth side surface 78 as shown in FIGS. 5, 6, and 8. The aft surface 76 is spaced apart axially from the fore surface 74. The sixth side surface 78 is spaced apart circumferentially from the fifth side surface 77. In the illustrative embodiment, the trailing edge section 46 only extends along the trailing edge 53.

The plurality of seals 32 includes leading edge seals 82, 84, trailing edge seals 86, 88, and circumferential seals 90, 91, 92, 93 as shown in FIGS. 5-8. The first leading edge seal 82 extends along the fore surface 66 of the leading edge portion 58. The second leading edge seal 84 is spaced apart axially from the first leading edge seal 82 and extends along the aft surface 68 of the leading edge portion 58. In the illustrative embodiment, the second leading edge seal 84 extends past the length of the aft surface 68 between the circumferential seals 90, 92. In other embodiments, the second leading edge seal 84 is sized to extend only the length of the aft surface 68.

The trailing edge seals 86, 88 extending along the fore and aft surfaces 74, 76 of the trailing edge section 46 as shown in FIGS. 5, 6, and 8. The first trailing edge seal 86 extends along the aft surface 76 of the trailing edge section 46. The second trailing edge seal 88 extends less than the entire length of the fore surface 74 of the trailing edge section 46. The second trailing edge seal 88 extends partway along the fore surface 74 so that portions of the fore surface 74, the fifth side surface 77, and the sixth side surface 78 are exposed to gases in the trailing edge section 46 as shown in FIGS. 6-8. The gaps 57 allow the flow of air 35 to leak into the trailing edge section 46 and pressurize the trailing edge section 46 of the channel 42.

The plurality of circumferential seals 90, 91, 92, 93 extend along portions of the circumferential side surfaces 69, 70, 71, 72 as shown in FIG. 6. The first circumferential seal 90 extends along the first side surface 69 of the first circumferential portion 59 of the leading edge section 44. The second circumferential seal 91 extends along the second side surface 70 of the first circumferential portion 59 of the leading edge section 44. The third circumferential seal 92 extends along the third side surface 71 of the second circumferential portion 60 of the leading edge section 44. The fourth circumferential seal 93 extends along the fourth side surface 72 of the second circumferential portion 60 of the leading edge section 44. In some embodiments, the second circumferential seal 91 and the fourth circumferential seal 93 may engage the second leading edge seal 84.

In the illustrative embodiment, the seals 82, 90, 92 are separate seals that each extend along their respective surfaces 66, 69, 71. In other embodiments, the seals 82, 90, 92 may be a single seal extending along all the surfaces 66, 69, 71. In the illustrative embodiment the plurality of seals 32 are dual wire seals. In other embodiments, the seals 32 may be "E" seals. In other embodiments, the seals 32 may be another suitable seal type.

A method of assembling and using the turbine shroud segment 26 may include several steps. The method includes locating the plurality of seals 32 in the leading and trailing edge sections 44, 46 of the channel 42 so that at least a portion of the dam 36, 38 is exposed. This locating step may include arranging the leading edge seals 82, 84 in the leading edge portion 58 of the leading edge section 44 so that the first leading edge seal 82 engages the fore surface 66 and the second leading edge seal engages the aft surface 68. This locating step further may include arranging the plurality of the circumferential seals 90, 91, 92, 93 in the respective circumferential side portion 59, 60 of the leading edge section 44 so that the seals 90, 91, 92, 93 engage the corresponding surfaces 69, 70, 71, 72. This locating step may further include arranging the trailing edge seals 86, 88 in the trailing edge section 46 so that the first trailing edge seal 86 engages the aft surface 76 and the second trailing edge seal 88 engages the fore surface 74.

The method may include locating that attachment portion 51 of the blade track segment 30 in the attachment-receiving space 41 of the carrier segment 28 to cause the plurality of seals 32 to engage the carrier segment 28 and the blade track segment 30 and form a gap 57 between the dam 36, 38 and the blade track segment 30. With the seals 32 engaged, the gases are conducted into the leading edge section 44 of the channel 42, and conducting the gases in the leading edge section 44 of the channel 42 through the gap 57 and into the trailing edge section 46 of the channel 42 as indicated by arrows 35.

Figure 9:
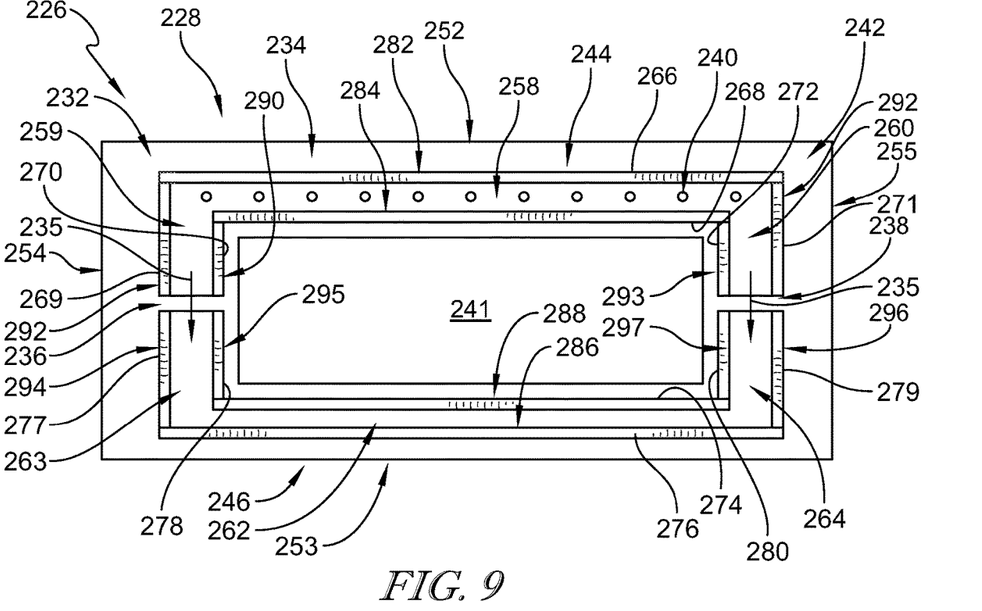
FIG. 9 is another embodiment of a turbine shroud segment adapted for use in the gas turbine engine of FIG. 1 showing the turbine shroud segment includes a carrier segment, a blade track segment, and a plurality of seals arranged between the carrier segment and the blade track segment, and further showing the carrier segment is shaped to define a radially inwardly opening channel that is divided into a leading edge section and a trailing edge section by a plurality of dams that extend into the channel at an intermediate point on either circumferential side of the carrier segment.

Another embodiment of a turbine shroud segment 226 in accordance with the present disclosure is shown in FIG. 9. The turbine shroud segment 226 is substantially similar to the turbine shroud segment 26 shown in FIGS. 1-8 and described herein. Accordingly, similar reference numbers in the 200 series indicate features that are common between the turbine shroud segment 26 and the turbine shroud segment 226. The description of the turbine shroud segment 26 is incorporated by reference to apply to the turbine shroud segment 226, except in instances when it conflicts with the specific description and the drawings of the turbine shroud segment 226.

The turbine shroud segment 226 includes a carrier segment 228 and a plurality of seals 232 as shown in FIG. 9. The carrier segment 228 is a metallic component supported by the outer casing 17 and is configured to support the blade track segment 30 in position adjacent to the blades 23 of the turbine wheel assembly 20. The carrier segment 228 extends circumferentially partway about the axis 11. The plurality of seals 232 arranged between the carrier segment 228 and the blade track segment 30 to block gases from flowing between the carrier segment 228 and the blade track segment 30.

The carrier segment 228 includes a carrier body 234, a plurality of dams 236, 238, and a plurality of feed holes 240 as shown in FIG. 9. The carrier body 234 is formed to define a radially inwardly opening attachment-receiving space 241 and a radially inwardly opening channel 242 that extends around the attachment-receiving space 241. The plurality of dams 236 are located in the channel 242 to separate the channel 242 into a plurality of sections 244, 246. The plurality of feed holes 240 extend through the carrier body 234 and open into channel 242 to provide a flow of air to the channel 242.

In the illustrative embodiment, the plurality of seals 232 are arranged within the sections 244, 246 and the flow of air conducted into the channel 242 causes the seals 232 to seal each section 244, 246. However, a portion of each of the plurality of dams 236, 238 is not engaged by the plurality of seals 232 to allow fluid communication between the plurality of sections 244, 246. This fluid communication or leakage across the dams 236, 238, indicated by arrows 235, pressurizes the trailing edge section 246 helping to seal the trailing edge section 246, while minimizing the need for additional flow of air to be provided to the trailing edge section 246.

In the illustrative embodiment, the carrier segment 228 is shaped to extend circumferentially partway around the axis 11 and defines a leading edge 252, a trailing edge 253, and circumferential sides 254, 255 as shown in FIG. 9. The trailing edge 253 is spaced axially aft of the leading edge 252. The circumferential sides 254, 255 extend between the leading and trailing edges 252, 253.

The plurality of sections 244, 246 formed by the plurality of dams 236, 238 in the channel 242 include a leading edge section 244 and a trailing edge section 246 as shown in FIG. 9. The leading edge section 244 extends along at least the leading edge 252 of the carrier body 234. The trailing edge section 246 extends along at least the trailing edge 253 of the carrier body 234.

In the illustrative embodiment, the leading edge section 244 includes a leading edge portion 258, a first circumferential side portion 259, and a second circumferential side portion 260 as shown in FIG. 9. The leading edge portion 258 extends along the leading edge 252. The first circumferential side portion 259 extends axially aft from the leading edge portion 258 along a portion of a first circumferential side 254 of the carrier body 234 toward the trailing edge 253. The second circumferential side portion 260 extends axially aft from the leading edge portion 258 along a portion of a second circumferential side 255 of the carrier body 234.

In the illustrative embodiment, the trailing edge section 246 includes a trailing edge portion 262, a first circumferential side portion 263, and a second circumferential side portion 264 as shown in FIG. 9. The trailing edge portion 262 extends along the leading edge 253. The first circumferential side portion 263 extends axially forward from the trailing edge portion 262 along a portion of the first circumferential side 254 of the carrier body 234 toward the leading edge 252. The second circumferential side portion 264 extends axially forward from the trailing edge portion 262 along a portion of the second circumferential side 255 of the carrier body 234.

The plurality of dams 236, 238 includes a first dam 236 and a second dam 238 as shown in FIGS. 2-7. The first dam 236 is located on the first circumferential side 254 of the carrier body 234. The second dam 238 is located on the second circumferential side 255 of the carrier body 234. The first dam 36 and the second dam 238 are arranged within the channel 242 to define the leading edge section 244 and the trailing edge section 246. In the illustrative embodiment, the dams 236, 238 are located at a midpoint on each circumferential side 254, 255 between the leading edge and trailing edge sections 244, 246.

The leading edge portion 258 of the leading edge section 244 includes a fore surface 266 and an aft surface 268 as shown in FIG. 9. The aft surface 268 is spaced apart axially from the fore surface 266.

The first circumferential side portion 259 of the leading edge section 244 includes a first side surface 269 and a second side surface 270 as shown in FIG. 9. The first side surface 269 extends axially aft from the fore surface 266 of the leading edge portion 258. The second side surface 270 is spaced apart circumferentially from the first side surface 269 and extends axially aft from the aft surface 268.

The second circumferential side portion 260 of the leading edge section 244 includes a third side surface 271 and a fourth side surface 272 as shown in FIG. 9. The third side surface 271 extends axially aft from the fore surface 266 of the leading edge portion 258. The fourth side surface 272 is spaced apart circumferentially from the third side surface 271 and extends axially aft from the aft surface 268.

The trailing edge portion 262 of the trailing edge section 246 includes a fore surface 274 and an aft surface 276 as shown in FIG. 9. The aft surface 276 is spaced apart axially from the fore surface 274.

The first circumferential side portion 263 of the trailing edge section 246 includes a fifth side surface 277 and a sixth side surface 278 as shown in FIG. 9. The fifth side surface 277 extends axially forward from the aft surface 276 of the trailing edge portion 262. The sixth side surface 278 is spaced apart circumferentially from the fifth side surface 277 and extends axially forward from the aft surface 276.

The second circumferential side portion 264 of the trailing edge section 246 includes a seventh side surface 279 and an eighth side surface 280 as shown in FIG. 9. The seventh side surface 279 extends axially forward from the aft surface 276 of the trailing edge portion 262. The eighth side surface 280 is spaced apart circumferentially from the seventh side surface 279 and extends axially forward from the aft surface 276.

The plurality of seals 232 includes leading edge seals 282, 284, trailing edge seals 286, 288, and circumferential seals 290, 291, 292, 293, 294, 295, 296, 297 as shown in FIG. 9. The first leading edge seal 282 extends along the fore surface 266 of the leading edge portion 258 of the leading edge section 244. The second leading edge seal 284 is spaced apart axially from the first leading edge seal 282 and extends along the aft surface 268 of the leading edge portion 258 of the leading edge section 244.

The trailing edge seals 286, 288 extending along the fore and aft surfaces 274, 276 of the trailing edge portion 262 of the trailing edge section 246 as shown in FIG. 6. The first trailing edge seal 286 extends along the aft surface 276 of the trailing edge portion 262 of the trailing edge section 246. The second trailing edge seal 288 extends along the fore surface 274 of the trailing edge portion 262 of the trailing edge section 246.

The plurality of circumferential seals 290, 291, 292, 293 extend along portions of the circumferential side surfaces 269, 270, 271, 272 as shown in FIG. 9. The first circumferential seal 290 extends along the first side surface 269 of the first circumferential portion 259 of the leading edge section 244. The second circumferential seal 291 extends along the second side surface 270 of the first circumferential portion 259 of the leading edge section 244. The third circumferential seal 292 extends along the third side surface 271 of the second circumferential portion 260 of the leading edge section 244. The fourth circumferential seal 293 extends along the fourth side surface 272 of the second circumferential portion 260 of the leading edge section 244.

In the illustrative embodiment, the seals 282, 290, 292 are separate seals that each extend along their respective surfaces 266, 269, 271. In other embodiments, the seals 282, 290, 292 may be a single seal extending along all the surfaces 266, 269, 271. Similarly, the seals 284, 291, 293 may be separate seals or a single seal extending along all the surface 268, 270, 272.

The plurality of circumferential seals 294, 295, 296, 297 extend along portions of the circumferential side surfaces 277, 278, 279, 280 as shown in FIG. 9. The fifth circumferential seal 294 extends along the fifth side surface 277 of the first circumferential portion 263 of the trailing edge section 246. The sixth circumferential seal 295 extends along the sixth side surface 278 of the first circumferential portion 263 of the trailing edge section 246. The seventh circumferential seal 296 extends along the seventh side surface 279 of the second circumferential portion 264 of the trailing edge section 246. The eighth circumferential seal 297 extends along the eighth side surface 280 of the second circumferential portion 264 of the trailing edge section 246.

In the illustrative embodiment, the seals 286, 294, 296 are separate seals that each extend along their respective surfaces 276, 277, 279. In other embodiments, the seals 286, 294, 296 may be a single seal extending along all the surfaces 276, 277, 279. Similarly, the seals 288, 295, 297 may be separate seals or a single seal extending along all the surface 274, 278, 280.

A method of assembling and using the turbine shroud segment 226 may include several steps. The method includes locating the plurality of seals 232 in the leading and trailing edge sections 244, 246 of the channel 242 so that at least a portion of the dam 236, 238 is exposed. This locating step may include arranging the leading edge seals 282, 284 in the leading edge portion 258 of the leading edge section 244 so that the first leading edge seal 282 engages the fore surface 266 and the second leading edge seal engages the aft surface 268. This locating step may include arranging the plurality of the circumferential seals 290, 291, 292, 293, 294, 295, 296, 297 in the respective circumferential side portion 259, 260, 263, 264 of the leading edge section 244 and trailing edge section 246 so that the seals 290, 291, 292, 293, 294, 295, 296, 297 engage the corresponding surfaces 269, 270, 271, 272, 277, 278, 279, 280. The locating step may include arranging the trailing edge seals 286, 288 in the trailing edge section 246 so that the first trailing edge seal 286 engages the aft surface 276 and the second trailing edge seal 288 engages the fore surface 274.

The method further includes locating that attachment portion 251 of the blade track segment 230 in the attachment-receiving space 241 of the carrier segment 228 to cause the plurality of seals 232 to engage the carrier segment 228 and the blade track segment 230 and form the gap 57 between the dam 236, 238 and the blade track segment 230. With the seals 232 engaged, the method includes conducting gases into the leading edge section 244 of the channel 242, and conducting the gases in the leading edge section 244 of the channel 242 through the gap 57 and into the trailing edge section 246 of the channel 242 as indicated by arrows 235.

Figure 10:
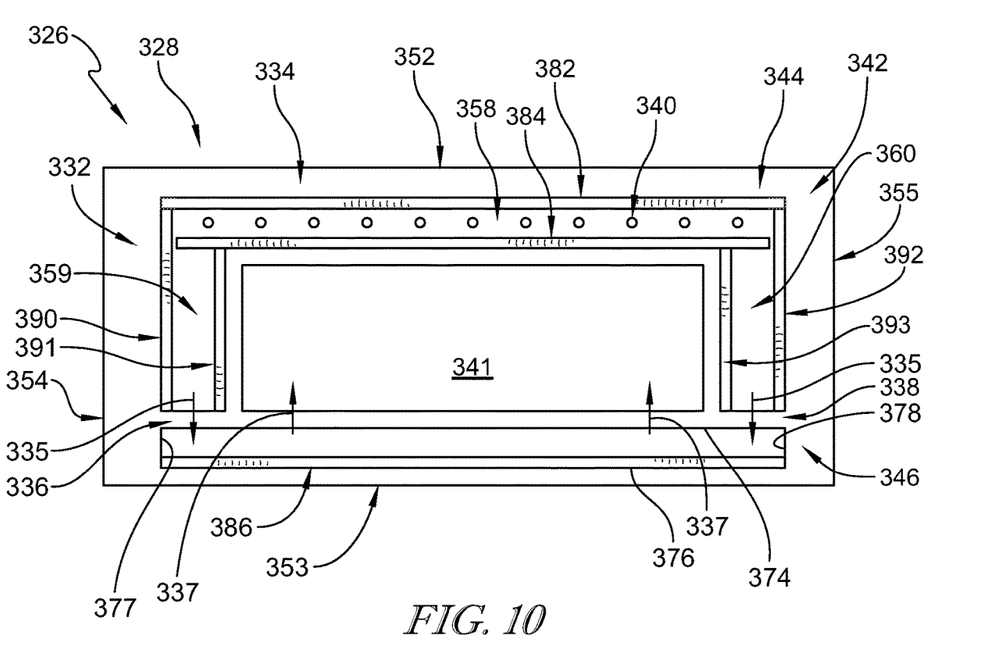
FIG. 10 another embodiment of a turbine shroud segment adapted for use in the gas turbine engine of FIG. 1 showing the turbine shroud segment includes a carrier segment and a plurality of seals, the carrier segment defining a radially inwardly opening channel that is divided into a leading edge section and a trailing edge section by a plurality of dams that extend into the channel, and the plurality of seals including leading edge seals arranged in the leading edge section and only one trailing edge seal arranged within the trailing edge section.

Another embodiment of a turbine shroud segment 326 in accordance with the present disclosure is shown in FIG. 10. The turbine shroud segment 326 is substantially similar to the turbine shroud segment 26 shown in FIGS. 1-8 and described herein. Accordingly, similar reference numbers in the 300 series indicate features that are common between the turbine shroud segment 26 and the turbine shroud segment 326. The description of the turbine shroud segment 26 is incorporated by reference to apply to the turbine shroud segment 326, except in instances when it conflicts with the specific description and the drawings of the turbine shroud segment 326.

The turbine shroud segment 326 includes a carrier segment 328 and a plurality of seals 332 as shown in FIG. 10. The carrier segment 328 is a metallic component supported by the outer casing 17 and is configured to support the blade track segment 30 in position adjacent to the blades 23 of the turbine wheel assembly 20. The carrier segment 328 extends circumferentially partway about the axis 11. The plurality of seals 332 arranged between the carrier segment 328 and the blade track segment 30 to block gases from flowing between the carrier segment 328 and the blade track segment 30.

The carrier segment 328 includes a carrier body 334, a plurality of dams 336, 338, and a plurality of feed holes 340 as shown in FIG. 10. The carrier body 334 is formed to define a radially inwardly opening attachment-receiving space 341 and a radially inwardly opening channel 342 that extends around the attachment-receiving space 341. The plurality of dams 336 are located in the channel 342 to separate the channel 342 into a plurality of sections 344, 346. The plurality of feed holes 340 extend through the carrier body 334 and open into channel 342 to provide a flow of air to the channel 342.

In the illustrative embodiment, the plurality of seals 332 are arranged within the sections 344, 346 and the flow of air conducted into the channel 342 causes the seals 332 to seal each section. However, a portion of each of the plurality of dams 336, 338 is not engaged by the plurality of seals 332 to allow fluid communication between the plurality of sections 344, 346. This fluid communication or leakage across the dams 336, 338, indicated by arrows 335, pressurizes the trailing edge section 346 helping to seal the trailing edge section 346, while minimizing the need for additional flow of air to be provided to the trailing edge section 346.

In the illustrative embodiment, the carrier segment 328 is shaped to extend circumferentially partway around the axis 11 and defines a leading edge 352, a trailing edge 353, and circumferential sides 354, 355 as shown in FIG. 9. The trailing edge 353 is spaced axially aft of the leading edge 352. The circumferential sides 354, 355 extend between the leading and trailing edges 352, 353. In the illustrative embodiment, the plurality of seals 332 are located in the channel 342 along the leading edge 352, the tailing edge 353, and the circumferential sides 354, 355 and a portion of each of the plurality of dams 336, 338 is not engaged by the plurality of seals 332 as shown in FIG. 10.

The plurality of sections 344, 346 formed by the plurality of dams 336, 338 in the channel 342 include a leading edge section 344 and a trailing edge section 346 as shown in FIG. 10. The leading edge section 344 extends along at least at least the leading edge 352 of the carrier body 334. The trailing edge section 346 extends along at least the trailing edge 353 of the carrier body 334. In the illustrative embodiment, the plurality of feed holes 340 extend through the carrier body 334 at the leading edge 352 and open into the leading edge section 344 of the channel 342.

In the illustrative embodiment, the leading edge section 344 includes a leading edge portion 358, a first circumferential side portion 359, and a second circumferential side portion 360 as shown in FIG. 10. The leading edge portion 358 extends along the leading edge 352. The first circumferential side portion 359 extends axially aft from the leading edge portion 358 along a first circumferential side 354 of the carrier body 334 toward the trailing edge 353. The second circumferential side portion 360 extends axially aft from the leading edge portion 358 along a second circumferential side 355 of the carrier body 334.

The plurality of dams 336, 338 includes a first dam 336 and a second dam 338 as shown in FIG. 10. The first dam 336 is located on a first circumferential side 354 of the carrier body 334 at an end of the first circumferential side portion 359. The second dam 338 is located on a second circumferential side 355 of the carrier body 334 at an end of the second circumferential side portion 360. The first dam 336 and the second dam 338 are arranged within the channel 342 to define the leading edge section 344 and the trailing edge section 346.

The trailing edge section 346 includes a fore surface 374, an aft surface 376, a first side surface 377, and a second side surface 378 as shown in FIG. 10. The aft surface 376 is spaced apart axially from the fore surface 374. The second side surface 378 is spaced apart circumferentially from the first side surface 377.

The plurality of seals 332 includes leading edge seals 382, 384, a trailing edge seal 386, and circumferential seals 390, 391, 392, 393 as shown in FIG. 10. The trailing edge seal 386 extends along the aft surface 376 of the trailing edge section 346. In the illustrative embodiment, the trailing edge seal 386 is the only seal 386 in the trailing edge section 346 such that the fore surface 374, the first side surface 377, and the second side surface 378 are exposed to gases in the trailing edge section 346, allowing fluid communication between the trailing edge section 346 and the attachment-receiving space 341 as indicated by arrows 337.

A method of assembling and using the turbine shroud segment 326 may include several steps. The method includes locating the plurality of seals 332 in the leading and trailing edge sections 344, 346 of the channel 342 so that at least a portion of the dam 336, 338 is exposed. This locating step may include arranging the leading edge seals 382, 384 in the leading edge portion 358 of the leading edge section 344 so that the first leading edge seal 382 engages the fore surface 366 and the second leading edge seal engages the aft surface 368. This locating step further includes arranging the plurality of the circumferential seals 390, 391, 392, 393 in the respective circumferential side portion 359, 360 of the leading edge section 344 so that the seals 390, 391, 392, 393 engage the corresponding surfaces 369, 370, 371, 372. This locating step further includes arranging the trailing edge seal 386 in the trailing edge section 346 so that the trailing edge seal 386 engages the aft surface 376 and leaves the fore surface 374 exposed.

The method further includes locating that attachment portion 351 of the blade track segment 330 in the attachment-receiving space 341 of the carrier segment 328 to cause the plurality of seals 332 to engage the carrier segment 328 and the blade track segment 330 and form the gap 57 between the dam 336, 338 and the blade track segment 330. With the seals 332 engaged, the method includes conducting gases into the leading edge section 344 of the channel 342, and conducting the gases in the leading edge section 344 of the channel 342 through the gap 57 and into the trailing edge section 346 of the channel 342 as indicated by arrows 335.

The method may further include conducting gases from the trailing edge section 346 of the channel 342 into the attachment-receiving space 341 through the gap formed between the trailing edge section 346 of the channel 342 and the attachment-receiving space 41. The flow of air in this instance is indicated by arrows 337. The conducting step includes allowing the flow of air entering the trailing edge section 346 to enter the space 341 because no seal is arranged along the fore surface 374 of the trailing edge section 346.

The present disclosure relates to sealing arrangements for ceramic matrix composite blade track segments. Ceramic matrix composite components are being considered due to the higher temperature capabilities of ceramic matrix composite materials relative to high temperature metallic alloys. This higher temperature capability may enable higher temperature and more efficient engine cycles, while reducing parasitic cooling flows typically used to cool the metallic components. However, the ceramic matrix composite components have much lower stress allowable when compared to the metallic components.

In some embodiments, the turbine shroud segment 26, 226, 326 is a cartridge style arrangement with a ceramic matrix composite blade track segment 30, a carrier segment 28, 228, 328 that may completely enclose the backside of the blade track segment 30, and a plurality of seals 32, 232, 332 that may seal between the carrier body 34, 234, 334 and the back side of the blade track segment 30.

In some embodiments, the shroud segment may include a perimeter seal. The perimeter seal may seal along all four edges of the blade track segment. In this way, the pressure on the inside or the attachment-receiving space of the carrier may be low. The low pressure may reduce pressure loading and resulting mechanical stresses within the ceramic matrix composite material of the blade track segment, while protecting against hot gas from the flow path entering into the attachment-receiving space. Such ingress of hot gases may result in failure of the metallic carrier.

In some embodiments, a perimeter seal may have a buffered cavity along all four edges of the blade track segment. Each edge may have formed an interconnected seal channel which located a seal the restricted air from leaking outward and another seal restricting air from leaking inward. This arrangement may enable high pressure air to be directed to the small buffer cavity, ensuring air leaks both in and outer along all four edges of the blade track segment 30. Such an arrangement may limit the pressure loading by applying the high pressure buffer air against a minimal area, while enabling the internal cavity to be set at a significantly lower pressure. However, such an arrangement may also result in a large pressure drop between the buffer cavity and trailing edge. The large pressure drop causes an increased leakage rate along the trailing edge of the blade track segment.

In other embodiments, the seal channel may be divided from the other seal channels that receive the perimeter seal.

As such, the trailing edge portion of the seal channel may be separated from the buffered sections with a single wire seal rather than a dual wire seal. Unlike the dual wire, buffered seal in other embodiments, the single wire seal may prevent leakage from the attachment-receiving space to the trailing edge.

As such the present disclosure teaches a perimeter sealing arrangement that significantly reduces the amount of air usage at the trailing edge 53, 253, 353 of the turbine shroud segment 26, while minimizing the large pressure drop across the trailing edge. In the illustrative embodiments, the channel 42, 242, 342 is divided into leading edge and trailing edge sections 44, 46, 244, 246, 344, 346 by dams 36, 38, 236, 238, 336, 338. The trailing edge section 46, 246, 346 may be separated from the buffered side portions 59, 60, 259, 260, 359, 360 by the dams 36, 38, 236, 238, 336, 338.

Further, in the illustrative embodiments, the trailing edge section 46, 246, 346 locates the wire seals 86, 88, 286, 288, 386 at the trailing edge 53, 253, 353 of the blade track segment 30. Unlike other embodiments, which use dual wire seals or a single seal at the trailing edge 53, 253, 353, the trailing edge section 46, 246, 346 does not have a dedicated flow of air to buffer the trailing edge section 46, 246, 346. Instead, the seal 88, 288 is shortened so that the seal 88, 288 ends before it reaches the dam 36, 38, 236, 238 on either end. The air leaking out the circumferential side portions 59, 60, 259, 260, moves across the dams 36, 38, 236, 238 separating the portions 59, 60, 259, 260 from the trailing edge section 46, 246. The air may enter the trailing edge section 46, 246 and may pressurized the section 46, 246, preventing any internal cavity air from leaking through the trailing edge section 46, 246. The use of leakage air from the leading edge section 44, 244 to buffer the trailing edge section 46, 246 decreases the overall parasitic flow.

In other illustrative embodiments, the trailing edge section 346 only has one seal 386 sealing the trailing edge section 346. The exposed surfaces 374, 377, 378 allow the air to move to the trailing edge section 346 and pressurize the trailing edge section 346.

In the illustrative embodiment of FIGS. 6-8, the channel 42 is divided into two zones or sections 44, 46 separated by walls or dams 36, 38. The two sections 44, 46 includes a leading edge section 44 with interconnected leading edge and side portions 58, 59, 60 and a single trailing edge section 46 along the trailing edge 53. The trailing edge seal 88 closest to the attachment-receiving space 41 along the trailing edge 53 is configured to be shorter than the trailing edge seal 86 arranged axially aft of the other seal 88. In the illustrative embodiment, the trailing edge seal 88 extends to and stops at the dams 36, 38 on either side 54, 55.

In the illustrative embodiment of FIG. 9, the leading edge section 244 and the trailing edge section 246 each extend partway around and along the circumferential sides 254, 255. The dams 236, 238 separate the sections 244, 246 at the intermediate or midpoint of the circumferential sides 254, 255 in the illustrative embodiment. In such an embodiment, the seals 232 end at the dam 236, 238.

In the illustrative embodiment of FIG. 10, the trailing edge section 346 locates a single seal 386 preventing air from leaking from the attachment-receiving space 341 to the trailing edge 353. The air leaking across the dam 36, 338 into the trailing edge section 346 is in free communication with the attachment-receiving space 341, and therefore leaks into the space 341.

In such an arrangement, leakage is allowed along the trailing edge 353 through the trailing edge seal 386, which minimizes parasitic flow as compared to a completely buffered perimeter seal with a separated buffer channel or zone along the trailing edge and dedicated feed of air into the trailing edge buffer zone.

In the illustrative embodiments, the leading edge section 44, 244, 344 may be feed air to maintain a high pressure to ensure no hot gas ingress from the flow path 25 along the length of the leading edge 52, 252, 352. The trailing edge section 46, 246, 346 has no dedicated flow of air to directly pressure the section 46, 246, 346. Instead, the air leaking across the dams 36, 38, 236, 238, 336, 338 from the leading edge section 44, 244, 344 to the trailing edge section 46, 246, 346 is used to pressurize the trailing edge section 46, 246, 346. The leakage of air into the trailing edge section 46, 246, 346 provides the pressure needed to prevent flow through the seals in the trailing edge section 46, 246, 346.

In some embodiments, the seals 32, 232, 332 may be dual wire, tandem seals with a metallic braid between the wire seals. In other embodiments, other types of seals may be used, for instance, metallic "E" seals nested together and arranged such that internal pressure may assist in sealing. The openings of the "E" seal may face inward, toward the channel 42, 242, 342.

In some embodiments, if the trailing edge section 46, 346 is only along the trailing edge 53, 353 and does not extend up the sides 54, 55, 254, 255, and the trailing edge seal 88 seal is shorter or removed, then the seal 88 may be assembled in the right location. In other embodiments, the section 46, 346 may be formed such that the seal 88 may be positively located in the correction location.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment comprising
    a carrier segment comprising metallic materials, the carrier segment extends circumferentially partway about an axis and includes a carrier body and a plurality of dams, the carrier body formed to define a radially inwardly opening attachment-receiving space and a radially inwardly opening channel that extends around the attachment-receiving space, the radially inwardly opening channel being at least partially defined by a first axial side wall and a second axial side wall, the plurality of dams being located in the channel and extending between and interconnecting the first axial side wall and the second axial side wall to separate the channel into a plurality of sections, and the plurality of dams being perpendicular to the first axial side wall and the second axial side wall,
    a blade track segment comprising ceramic matrix composite materials, the blade track segment formed to include a runner shaped to extend circumferentially partway around the axis and an attachment portion that extends radially outward from the runner into the attachment-receiving space formed by the carrier body, and
    a plurality of seals located in the channel and engaged with the carrier body and the runner of the blade track segment to block gases from flowing between the carrier segment and the blade track segment,
    wherein a portion of each of the plurality of dams is exposed and not engaged by the plurality seals to allow fluid communication between the plurality of sections of the channel through gaps defined radially between the plurality of dams and the runner of the blade track segment.

2. The turbine shroud of claim 1, wherein the plurality of dams includes a first dam located on a first circumferential side and a second dam located on a second circumferential side of the carrier body to define a trailing edge section included in the plurality of sections of the channel that extends along at least a trailing edge of the carrier body and the plurality of seals includes a first wire seal located in the trailing edge section that extends circumferentially along an entire length of the trailing edge section.

3. The turbine shroud segment of claim 2, wherein the plurality of seals includes a second wire seal located in the trailing edge section, the second wire seal extends circumferentially less than the entire length of the trailing edge section, and the first wire seal is spaced apart axially from the second wire seal.

4. The turbine shroud segment of claim 3, wherein the trailing edge section includes a fore surface, an aft surface spaced apart axially from the fore surface, a first side surface, and a second side surface spaced apart circumferentially from the first side surface, the first wire seal extends along the aft surface, and the second wire seal extends along the fore surface so that portions of the fore surface, the first side surface, and the second side surface are exposed to gases in the trailing edge section.

5. The turbine shroud segment of claim 2, wherein the trailing edge section includes a fore surface, an aft surface spaced apart axially from the fore surface, a first side surface, and a second side surface spaced apart circumferentially from the first side surface, the first wire seal is engaged with the aft surface of the trailing edge section and is the only seal in the trailing edge section such that the fore surface, the first side surface, and the second side surface are exposed to gases in the trailing edge section.

6. The turbine shroud segment of claim 2, wherein the trailing edge section of the channel extends at least partway along the first circumferential side and the second circumferential side of the carrier body.

7. The turbine shroud segment of claim 1, wherein the plurality of sections of the channel includes a trailing edge section that extends only circumferentially along a trailing edge side of the carrier body.

8. The turbine shroud segment of claim 1, wherein the plurality of seals include a plurality of wire seals.

9. The turbine shroud segment of claim 1, wherein the carrier body is formed to include a plurality of feed holes that open into the channel to provide cooling air to the channel and the plurality of feed holes do not open into at least one of the plurality of sections of the channel.

10. A turbine shroud segment comprising
a carrier segment that extends circumferentially partway about an axis, the carrier segment formed to define an attachment-receiving space and a channel that extends around the attachment-receiving space, the radially inwardly opening channel at least partially defined by a first axial side wall and a second axial side wall, the channel being separated into a first section and a second section by a dam located in the channel and extending between and interconnecting the first axial side wall and the second axial side wall, and the dam being perpendicular to the first axial side wall and the second axial side wall,
a blade track segment formed to include a runner shaped to extend circumferentially partway around the axis and an attachment portion that extends radially outward from the runner into the attachment-receiving space, and
a plurality of seals located in the channel, wherein the plurality of seals do not extend along a portion of the first section and the second section of the channel such that the portion is unsealed to allow fluid communication between the first section and the second section through a gap formed radially between the dam and the runner of the blade track segment.

11. The turbine shroud segment of claim 10, wherein the dam includes a fore face and an aft face, the plurality of seals do not extend along at least one portion of the fore face and the aft face of the dam so that the at least one portion of the fore face and the aft face of the dam are exposed to gases in the first section and the second section of the channel.

12. The turbine shroud segment of claim 10, wherein the plurality of seals includes wire seals.

13. The turbine shroud segment of claim 10, wherein the second section of the channel includes a fore surface, an aft surface spaced apart axially from the fore surface, a first side surface, and a second side surface spaced apart circumferentially from the first side surface, and the plurality of seals includes a first seal that extends circumferentially along an entire length of the aft surface and a second seal that extends circumferentially along less than an entire length of the fore surface.

14. The turbine shroud segment of claim 10, wherein the first section of the channel extends along a leading edge side, a first circumferential side, and a second circumferential side of the carrier segment and the second section extends only along a trailing edge side of the carrier segment.

15. The turbine shroud segment of claim 10, wherein the first section of the channel extends along a leading edge side, a first circumferential side, and a second circumferential side of the carrier segment and the second section extends along a trailing edge side, the first circumferential side, and the second circumferential side of the carrier segment.

16. The turbine shroud segment of claim 10, wherein the second section of the channel includes a fore surface, an aft surface spaced apart axially from the fore surface, a first side surface, and a second side surface spaced apart circumferentially from the first side surface, and the plurality of seals are spaced apart from the fore surface such that the entire fore surface is exposed to gases in the second section of the channel.

17. The turbine shroud segment of claim 10, wherein the carrier segment is formed to include a plurality of feed holes that open into the first section of the channel and no feed holes open into the second section of the channel.

18. A method comprising
providing a carrier segment, a blade track, and a plurality of seals, the carrier segment formed to define a radially inwardly opening attachment-receiving space and a channel at least partially defined by a first axial side wall and a second axial side wall that is separated by a dam located in the channel and extending between and interconnecting the first axial side wall and the second axial side wall into a first section that extends along at least a leading edge side and a second section that extends along at least a trailing edge side of the carrier segment, the dam being perpendicular to the first axial side wall and the second axial side wall,
locating the plurality of seals in the first section and the second section of the channel so that at least a portion of the dam is exposed, locating a portion of the blade track segment in the attachment-receiving space of the carrier segment to cause the plurality of seals to engage the carrier segment and the blade track segment and form a gap between the dam and the blade track segment, conducting gases into the first section of the channel, and conducting the gases from the first section of the channel through the gap and into the second section of the channel.

19. The method of claim 18, wherein conducting gases into the first section includes conducting gases through feed holes formed in the carrier segment into the first section, wherein no feed holes open into the second section of the channel.

20. The method of claim 18, further comprising conducting gases from the second section of the channel into the attachment-receiving space through a gap formed between the second section of the channel and the attachment-receiving space.

* * * * *